(12) United States Patent
Lührmann et al.

(10) Patent No.: US 9,435,253 B2
(45) Date of Patent: Sep. 6, 2016

(54) EXHAUST GAS TURBOCHARGER MODULE AND INTERNAL COMBUSTION ENGINE OUTFITTED THEREWITH

(71) Applicant: MAN Diesel & Turbo SE, Augsburg (DE)

(72) Inventors: Eva Lührmann, Moorenweis (DE); Max Eder, Augsburg (DE); Ulrich Deisenhofer, Haldenwang (DE); Stefan Rehle, Türkheim (DE); Florian Würr, Oberstaufen (DE); Franz Koch, Augsburg (DE); Marco Konle, München (DE); Matthias Söngen, Augsburg (DE)

(73) Assignee: MAN Diesel & Turbo SE, Augsburg (DE)

( * ) Notice: Subject to any disclaimer, the term of this patent is extended or adjusted under 35 U.S.C. 154(b) by 0 days.

(21) Appl. No.: 13/790,805

(22) Filed: Mar. 8, 2013

(65) Prior Publication Data
US 2013/0232969 A1 Sep. 12, 2013

(30) Foreign Application Priority Data

Mar. 8, 2012 (DE) .......................... 10 2012 203 701

(51) Int. Cl.
*F02B 33/44* (2006.01)
*F02B 37/00* (2006.01)
(Continued)

(52) U.S. Cl.
CPC .......... *F02B 37/004* (2013.01); *F02B 29/0412* (2013.01); *F02B 29/0475* (2013.01); *F02B 37/007* (2013.01); *F02B 37/013* (2013.01); *Y02T 10/144* (2013.01); *Y02T 10/146* (2013.01)

(58) Field of Classification Search
CPC .. F02B 37/13; F02B 37/004; F02B 29/0412; F02B 29/0475; F02B 37/007
USPC ........ 60/599, 602, 605.1, 611, 612; 123/562
See application file for complete search history.

(56) References Cited

U.S. PATENT DOCUMENTS 3,469,393 A * 9/1969 Tryhorn ........................... 60/609
4,032,262 A * 6/1977 Zehnder ........................ 417/409
(Continued)

FOREIGN PATENT DOCUMENTS

DE  24 45 474         4/1976
DE  27 52 988 A1     6/1978
(Continued)

*Primary Examiner* — Thai Ba Trieu
*Assistant Examiner* — Jason T Newton
(74) *Attorney, Agent, or Firm* — Cozen O'Connor

(57) ABSTRACT

An exhaust gas turbocharger module and internal combustion engine outfitted therewith are disclosed. The exhaust gas turbocharger modules have an individual turbocharging assembly with a low-pressure exhaust gas turbocharger with a low-pressure turbine and a low-pressure compressor which have a common first turbocharger axis. A high-pressure exhaust gas turbocharger is provided with a high-pressure turbine and a high-pressure compressor which have a common second turbocharger axis extending perpendicular to the first turbocharger axis. The low-pressure turbine is connected downstream of the high-pressure turbine via an exhaust gas connection line, and the high-pressure compressor is connected downstream of the low-pressure compressor via a charge air connection line. A housing receives the low-pressure turbine, the high-pressure turbine and the exhaust gas connection line. The low-pressure compressor, the high-pressure compressor, and the charge air connection line are arranged outside of the housing.

13 Claims, 14 Drawing Sheets

(51) Int. Cl.
  *F02B 37/007* (2006.01)
  *F02B 37/013* (2006.01)
  *F02B 29/04* (2006.01)

(56) References Cited

U.S. PATENT DOCUMENTS

| | | | | |
|---|---|---|---|---|
| 4,196,593 | A | * | 4/1980 | Froeliger .................. 60/612 |
| 4,400,945 | A | * | 8/1983 | Deutschmann et al. ........ 60/612 |
| 4,753,076 | A | | 6/1988 | Deutschmann et al. |
| 5,528,902 | A | * | 6/1996 | Hoerl et al. ................ 60/612 |
| 5,560,207 | A | * | 10/1996 | Ramsden et al. ........... 60/605.1 |
| 5,577,900 | A | * | 11/1996 | Ramsden et al. ........... 417/407 |
| 5,697,217 | A | * | 12/1997 | Ramsden et al. ............ 60/612 |
| 7,287,379 | B2 | * | 10/2007 | Gobert et al. .................. 60/612 |
| 7,302,800 | B2 | * | 12/2007 | Klingel ........................ 60/612 |
| 7,310,947 | B2 | * | 12/2007 | Baumann ....................... 60/612 |
| 8,316,642 | B2 | * | 11/2012 | McEwan et al. .............. 60/612 |
| 2012/0087785 | A1 | * | 4/2012 | Joergl et al. .............. 415/182.1 |

FOREIGN PATENT DOCUMENTS

| | | | |
|---|---|---|---|
| DE | 80 04 048 U1 * | 3/1985 | ............. F02B 37/00 |
| DE | 36 07 698 C1 | 6/1987 | |
| DE | 198 56 960 A1 | 6/2000 | |
| DE | 20 2010 007 768 U1 | 8/2010 | |
| DE | 11 2010 002 761 T5 | 8/2012 | |
| JP | 2002115543 A * | 4/2002 | ............... F01N 7/10 |

* cited by examiner

EXHAUST GAS TURBOCHARGER MODULE AND INTERNAL COMBUSTION ENGINE OUTFITTED THEREWITH

BACKGROUND OF THE INVENTION

1. Field of the Invention

The present invention is directed to an exhaust gas turbocharger module and an internal combustion engine outfitted with an exhaust gas turbocharger module of this kind.

2. Description of the Related Art

An exhaust gas turbocharger module and an internal combustion engine of the type mentioned above are known from German Utility Model No. 80 04 048 U1.

SUMMARY OF THE INVENTION

The present invention has an object of providing an exhaust gas turbocharger module and an internal combustion engine outfitted with an exhaust gas turbocharger module such that an improved turbocharging of the internal combustion engine is achieved.

According to a first aspect of the present invention, an exhaust gas turbocharger module for an internal combustion engine has a turbocharging assembly with: a low-pressure exhaust gas turbocharger with a low-pressure turbine and a low-pressure compressor which have a common first turbocharger axis, and a high-pressure exhaust gas turbocharger with a high-pressure turbine and a high-pressure compressor which have a common second turbocharger axis extending at least approximately perpendicular to the first turbocharger axis, wherein the low-pressure turbine is connected downstream of the high-pressure turbine via an exhaust gas connection line, and the high-pressure compressor is connected downstream of the low-pressure compressor via a charge air connection line; and a housing which is shaped in such a way that the low-pressure turbine, the high-pressure turbine and the exhaust gas connection line are received therein, and the low-pressure compressor, the high-pressure compressor and the charge air connection line are arranged outside of the housing.

Due to the fact that the exhaust gas turbocharger module has only one individual two-stage turbocharging assembly as defined above, a relatively close gradation of modules can be carried out so that the turbocharging of an internal combustion engine outfitted with one or more exhaust gas turbocharger modules of this type can be more finely gradated and can therefore be better adapted to parameters (e.g., number of cylinders and power) of the respective internal combustion engine and the respective load conditions thereof. Accordingly, the exhaust gas turbocharger module according to the invention permits close power gradations with optimized turbocharging.

In other words, due to the close module gradation, i.e., a comparatively lower boost power per exhaust gas turbocharger module and, therefore, a comparatively higher quantity of exhaust gas turbocharger modules, highly diverse cylinder variants and power variants of an internal combustion engine can be turbocharged in an optimal manner with one or more constructionally identical exhaust gas turbocharger modules according to the invention. Accordingly, in case of service, all cylinder variants and power variants can be provided with one and the same type of exhaust gas turbocharger module.

As a result of the comparatively high quantity of exhaust gas turbochargers and add-on parts which are accordingly demanded in terms of production, more favorable unit costs can be achieved for the individual components of the exhaust gas turbocharger modules.

According to an embodiment of the exhaust gas turbocharger module according to the present invention, the turbocharging assembly further has a charge air intercooler which is arranged outside of the housing and connected into the charge air connection line.

According to a further embodiment of the exhaust gas turbocharger module according to the present invention, the turbocharging assembly further has an exhaust gas bypass line which is arranged inside the housing and which connects an exhaust gas input of the high-pressure turbine to an exhaust gas input of the low-pressure turbine, wherein a blocking valve is arranged in the exhaust gas bypass line for selectively opening and closing the exhaust gas bypass line. In other words, according to this embodiment of the present invention, a so-called wastegate (exhaust gas bypass line with blocking valve) is compactly integrated in the housing for selectively regulating charge air.

According to another embodiment of the exhaust gas turbocharger module according to the present invention, the charge air connection line extends from the low-pressure compressor to the high-pressure compressor in such a way that it forms a triangle with the first turbocharger axis and second turbocharger axis in a projection in a common plane with the first turbocharger axis and second turbocharger axis.

This guiding of the charge air connection line advantageously promotes a particularly compact implementation of the exhaust gas turbocharger module according to the present invention so that the exhaust gas turbocharger module takes up relatively little installation space.

According to yet another embodiment of the exhaust gas turbocharger module according to the present invention, the first turbocharger axis is arranged in a first axis plane and the second turbocharger axis is arranged in a second axis plane, wherein the second axis plane is arranged parallel to and at a predetermined distance from the first axis plane.

As a result of this axial offset, the exhaust gas connection line can lead from an exhaust gas output of the high-pressure turbine to an exhaust gas input of the low-pressure turbine in a particularly space-saving manner so that the compactness of the exhaust gas turbocharger module is further improved.

According to a further embodiment of the exhaust gas turbocharger module according to the present invention, the housing is formed of a plurality of parts so that it has two housing dividing planes extending parallel to one another and at a distance from one another. The first turbocharger axis preferably lies in one of the housing dividing planes, and the second turbocharger axis preferably lies in the other housing dividing plane.

In this way, the exhaust gas turbocharger module according to the present invention can be preassembled in an outstanding manner so that fully preassembled exhaust gas turbocharger modules can be used for installing in an internal combustion engine, which reduces assembly effort at the setup location of the internal combustion engine.

According to another embodiment of the exhaust gas turbocharger module according to the present invention, the housing is constructed so as to be at least partially double-walled so that at least one cooling channel is formed between an outer wall of the housing and an inner wall of the housing.

Accordingly, a cooling of the outer surface of the housing can be achieved in an extremely compact manner so that, among other things, the operating reliability of the exhaust gas turbocharger module according to the invention is increased.

According to a second aspect of the present invention, an internal combustion engine is provided which has a plurality of cylinders and a quantity of at least one exhaust gas turbocharger module according to one or more or all of the embodiment of the present invention described above in any conceivable combination, wherein the high-pressure turbine is connected on the input side to an exhaust gas outlet line of the internal combustion engine, and wherein the high-pressure compressor is connected on the output side to a charge air input line of the internal combustion engine.

Due to the fact that the exhaust gas turbocharger module has only one individual two-stage turbocharging assembly as defined above, a relatively close gradation of modules can be carried out so that the turbocharging of the internal combustion engine can be more finely gradated and can therefore be better adapted to parameters (e.g., number of cylinders and power) of the internal combustion engine and the respective load conditions thereof. Accordingly, the exhaust gas turbocharger module according to the present invention permits close power gradations with optimized turbocharging.

In other words, by means of the close module gradation, i.e., a comparatively lower boost power per exhaust gas turbocharger module and, therefore, a comparatively higher quantity of exhaust gas turbocharger modules, highly diverse cylinder variants and power variants of an internal combustion engine can be turbocharged in an optimal manner with one or more constructionally identical exhaust gas turbocharger modules according to the invention. Accordingly, in case of service, all cylinder variants and power variants can be provided with one and the same type of exhaust gas turbocharger module.

As a result of the comparatively high quantity of exhaust gas turbochargers and add-on parts which are accordingly demanded in terms of production, more favorable unit costs can be achieved for the individual components of the exhaust gas turbocharger modules.

According to an embodiment of the internal combustion engine according to the present invention, this internal combustion engine has a quantity of cylinders that is integrally divisible by four, wherein the quantity of exhaust gas turbocharger modules corresponds to a result of the quantity of cylinders divided by four so that one exhaust gas turbocharger module is provided for every four cylinders.

Since cylinder number gradations of four cylinders (e.g., 8-cylinder engine, 12-cylinder engine, 16-cylinder engine, 20-cylinder engine) are installed particularly in large engines, the module gradation is exactly suited according to the present invention to the cylinder number gradation, which results in identical matching for all exhaust gas turbochargers.

According to a further embodiment of the internal combustion engine according to the present invention, the cylinders of the internal combustion engine are arranged in at least one cylinder row along a longitudinal axis of the internal combustion engine, wherein the quantity of exhaust gas turbocharger modules are arranged along the longitudinal axis of the internal combustion engine in a module row. This advantageously promotes a space-saving arrangement of the exhaust gas turbocharger modules in the internal combustion engine.

According to another embodiment of the internal combustion engine according to the present invention, the quantity of exhaust gas turbocharger modules is arranged on an upper side of the internal combustion engine in such a way that each charge air connection line traverses the longitudinal axis.

Accordingly, in this construction all components of each exhaust gas turbocharger module, with the exception of the charge air intercooler and the charge air connection line, can be arranged on a longitudinal side of the internal combustion engine, whereas the charge air intercooler can be arranged on the opposite longitudinal side of the internal combustion engine. This advantageously further promotes the space-saving arrangement of the exhaust gas turbocharger modules at the internal combustion engine.

According to yet another embodiment of the internal combustion engine according to the present invention, a charge air aftercooler is provided for each cylinder row, which charge air aftercooler is arranged at a longitudinal end of the internal combustion engine and is connected on the input side to a charge air output of the high-pressure compressor and on the output side to charge air inputs of the cylinders of the internal combustion engine.

Due to the space-saving arrangement of the charge air aftercooler at the longitudinal end (e.g., on the nondriving end) of the internal combustion engine, each row of cylinders can be provided with its own charge air aftercooler, which improves the cooling of the charge air and, therefore, the performance of the internal combustion engine.

According to a further embodiment of the internal combustion engine according to the present invention, the cylinders of the internal combustion engine are arranged in two cylinder rows which are parallel to one another and axially symmetrical with respect to the longitudinal axis of the internal combustion engine, wherein the charge air input line has a charge air manifold which extends between the two rows of cylinders along the longitudinal axis of the internal combustion engine and is connected to the charge air output of every high-pressure compressor.

By means of this particularly space-saving guidance of the charge air manifold between the cylinder rows, the available installation space in the internal combustion engine is utilized in an extremely efficient manner.

According to another embodiment of the internal combustion engine according to the present invention, the charge air manifold branches at the longitudinal end of the internal combustion engine into two charge air branch lines which are connected in each instance to one of the charge air aftercoolers, wherein the charge air input line for each of the two cylinder rows has a charge air distributor line connected to the respective charge air inputs of the cylinders of the internal combustion engine, and wherein the two charge air aftercoolers are connected on the output side in each instance to one of the charge air distributor lines.

According to yet another embodiment of the internal combustion engine according to the present invention, the charge air manifold extends below each charge air connection line of the quantity of exhaust gas turbocharger modules, i.e., between the upper side of the internal combustion engine and each charge air connection line.

By means of this particularly space-saving guidance of the charge air manifold between the cylinder rows, the available installation space in the internal combustion engine is utilized even more efficiently.

Finally, the solution according to the present invention is able to reduce the volumes of the exhaust gas-conducting and charge air-conducting lines upstream of the exhaust gas turbochargers, between the exhaust gas turbochargers and downstream of the exhaust gas turbochargers. The present invention realizes a sequential construction (within the partial modules) of the media guidance (coolant, charge air and exhaust gas) in longitudinal direction of the internal combustion engine. In the solution according to the present invention, the quantity, size and position of the respective units and components of one or more exhaust gas turbocharger modules is so configured that the above-mentioned advantages are all realized within compact dimensions.

The present invention also expressly extends to embodiments which are not given by combinations of features from explicit references to the claims so that the disclosed features of the invention can be combined with one another in any way insofar as technically meaningful.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood, that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
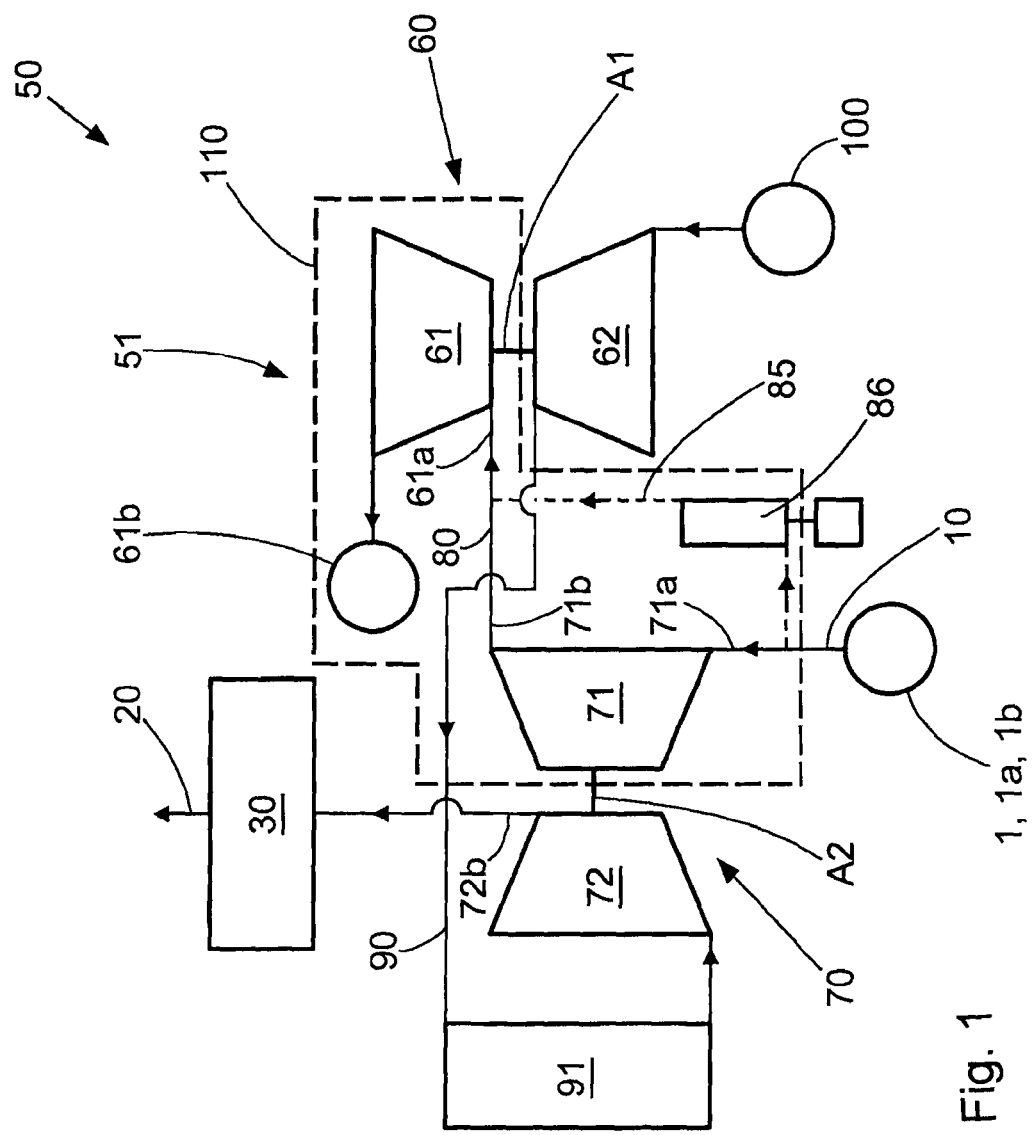
FIG. 1 shows a block diagram of an exhaust gas turbocharger module for an internal combustion engine according to an embodiment form of the invention.
Figure 2:
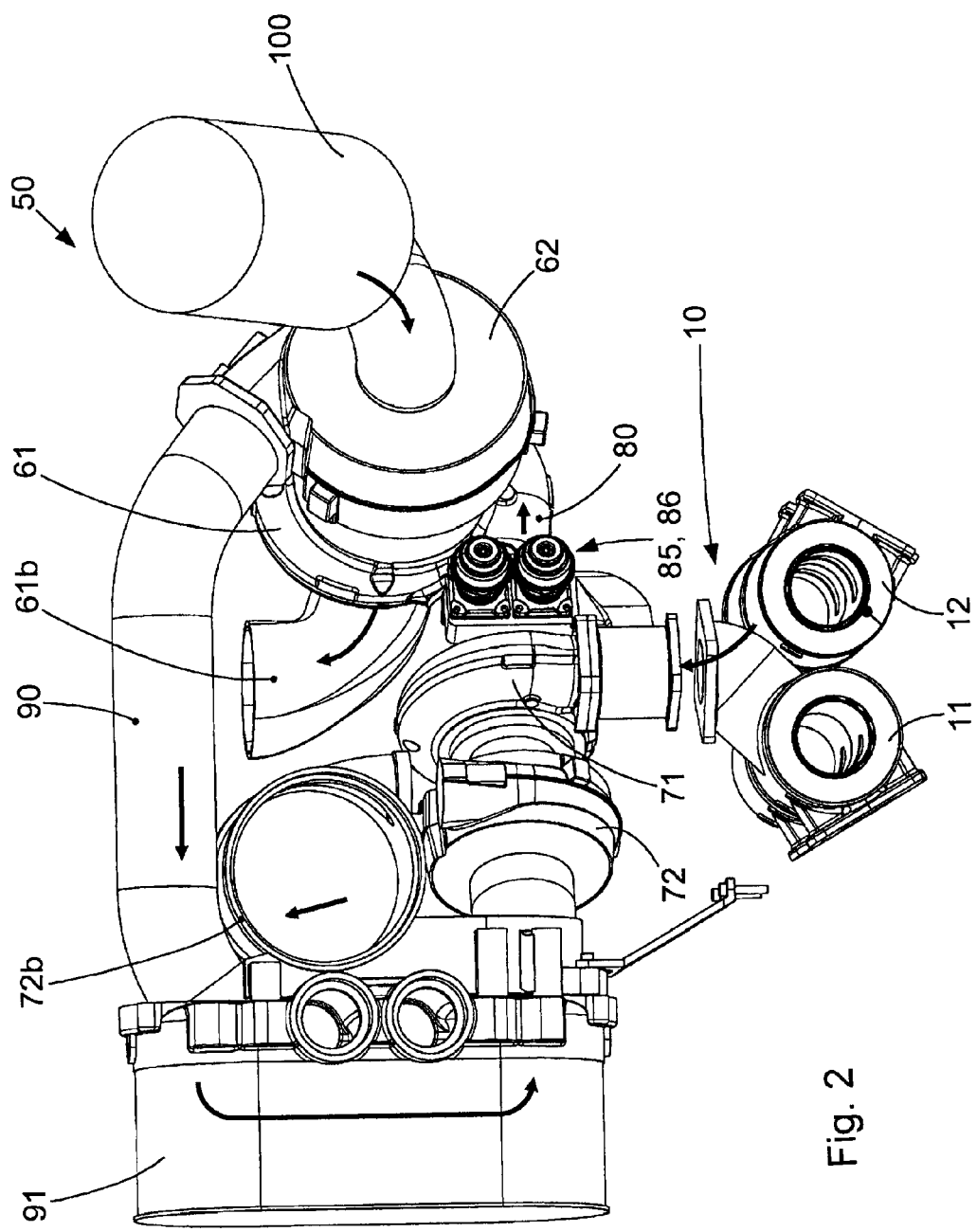
FIG. 2 shows an elevation of an exhaust gas turbocharger module according to the invention viewed from a driving end of the internal combustion engine in longitudinal direction thereof, wherein the flow directions of the various media (charge air and exhaust gas) are indicated by bold arrows.

An exhaust gas turbocharger module 50 according to an embodiment of the present invention and internal combustion engines 1, 1a, 1b outfitted with an exhaust gas turbocharger module 50 of this kind will be described in the following with reference to FIGS. 1 to 14.

As can be seen from FIGS. 1 to 8, the exhaust gas turbocharger module 50 according to the present invention has an individual turbocharging assembly 51 with a low-pressure exhaust gas turbocharger 60 having a low-pressure turbine 61 and a low-pressure compressor 62 which have a common first turbocharger axis A1 and a high-pressure exhaust gas turbocharger 70 with a high-pressure turbine 71 and a high-pressure compressor 72 having a common second turbocharger axis A2 extending approximately perpendicular to the first turbocharger axis A1.

The high-pressure turbine 71 is connected on the exhaust gas input side to an exhaust gas outlet line 10 of the internal combustion engine 1, 1a, 1b. The exhaust gas outlet line 10 has a first exhaust gas outlet line part 11 and a second exhaust gas outlet line part 12 for cylinder rows 35, 40 which will be described further below.

The high-pressure compressor 72 is connected on the charge air output side to a charge air input line 20 of the internal combustion engine 1, 1a, 1b. A charge air aftercooling arrangement 30 which will be described in more detail below is provided in the charge air input line 20 of the internal combustion engine 1, 1a, 1b.

The low-pressure turbine 61 is connected on the exhaust gas output side via an exhaust gas release line 61b of the exhaust gas turbocharger module 50 to an exhaust line (not shown) of the internal combustion engine 1, 1a, 1b, wherein; the low-pressure compressor 62 is connected on the charge air input side to an air filter 100.

The low-pressure turbine 61 is connected via an exhaust gas connection line 80 to the high-pressure turbine 71 downstream thereof so that the exhaust gas flowing out of the high-pressure turbine 71 on the exhaust gas output side is guided back to the low-pressure turbine 61 on the exhaust gas input side so as to be further utilized for driving purposes.

The high-pressure compressor 72 is connected via a charge air connection line 90 to the low-pressure compressor 62 downstream thereof so that the pre-compressed charge air flowing out of the low-pressure compressor 62 on the charge air output side is guided back to the high-pressure compressor 72 on the charge air input side for further compression.

The individual turbocharging assembly 51 of the exhaust gas turbocharger module 50 further has a charge air intercooler 91 which is connected into the charge air connection line 90.

Further, the individual turbocharging assembly 51 of the exhaust gas turbocharger module 50 has an exhaust gas bypass line 85 which is arranged inside the housing 110 and which connects an exhaust gas input 71a of the high-pressure turbine 71 to an exhaust gas input 61a of the low-pressure turbine 61 and to the exhaust gas connection line 80. A blocking valve 86 is arranged in the exhaust gas bypass line 85 for selectively opening and closing the exhaust gas bypass line 85. The exhaust gas bypass line 85 and the blocking valve 86 accordingly realize a wastegate, as it is called, which is integrated compactly in the housing for selectively regulating charge air.

The exhaust gas turbocharger module 50 further has a housing 110 which is shaped in such a way that the low-pressure turbine 61, the high-pressure turbine 71, the exhaust gas connection line 80, the exhaust gas bypass line 85 and the blocking valve 86 are received therein, and the low-pressure compressor 62, the high-pressure compressor 72, the charge air connection line 90 and the charge air intercooler 91 are arranged outside of the housing 110.

Figure 6:
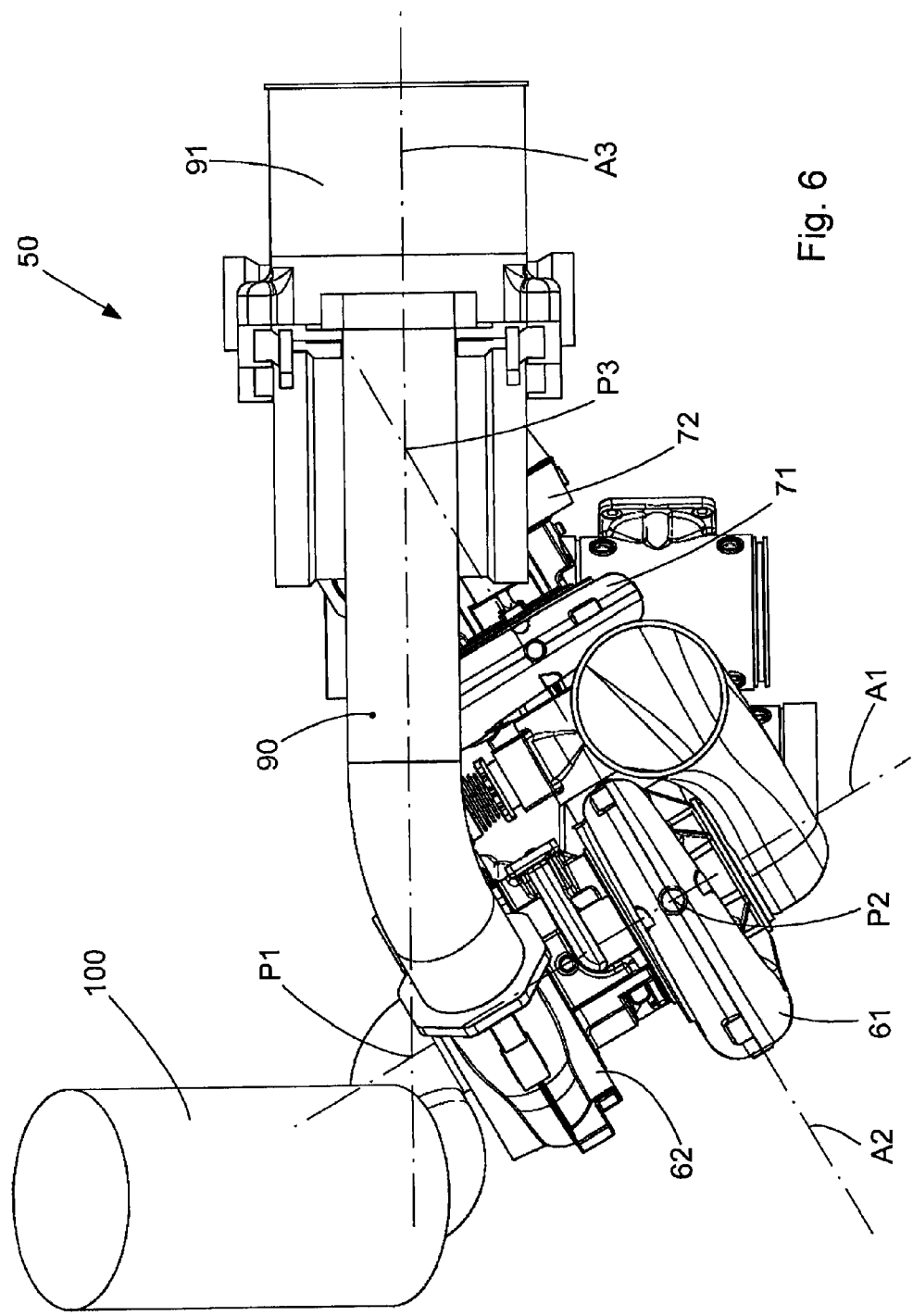
FIG. 6 shows a top view of the exhaust gas turbocharger module from FIG. 2.

As can be seen particularly from FIG. 6, the charge air connection line 90 extends from the low-pressure compressor 62 to the high-pressure compressor 72 in such a way that a longitudinal axis A3 of the charge air connection line 90 forms a triangle P1, P2, P3 with the turbocharger axis A1 and second turbocharger axis A2 in projection in a common plane (the drawing plane in FIG. 6) with the first turbocharger axis A1 and the second turbocharger axis A2.

Figure 3:
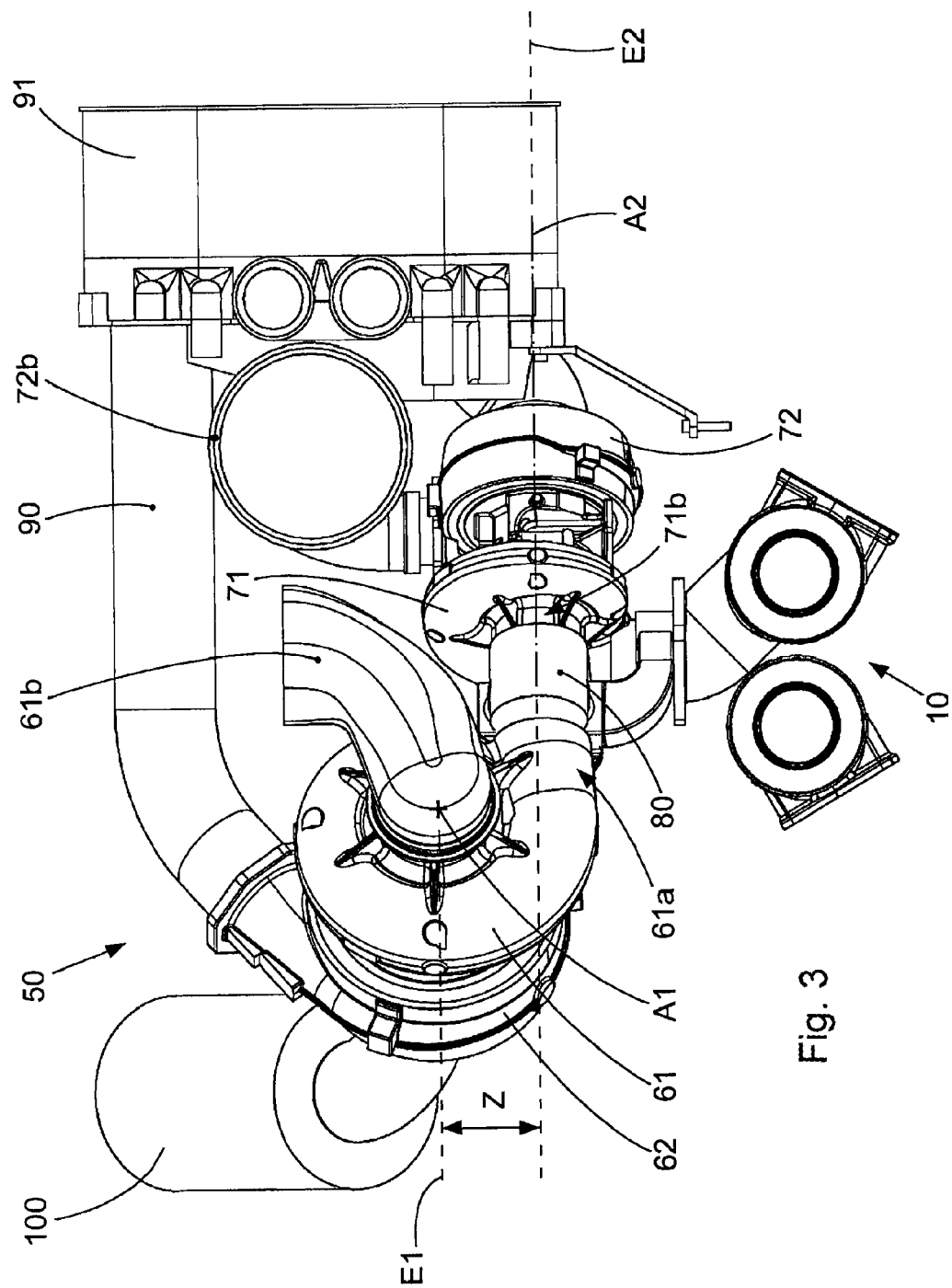
FIG. 3 shows a view of the exhaust gas turbocharger module from FIG. 2 viewed from a nondriving end of the internal combustion engine in longitudinal direction thereof.
Figure 4:
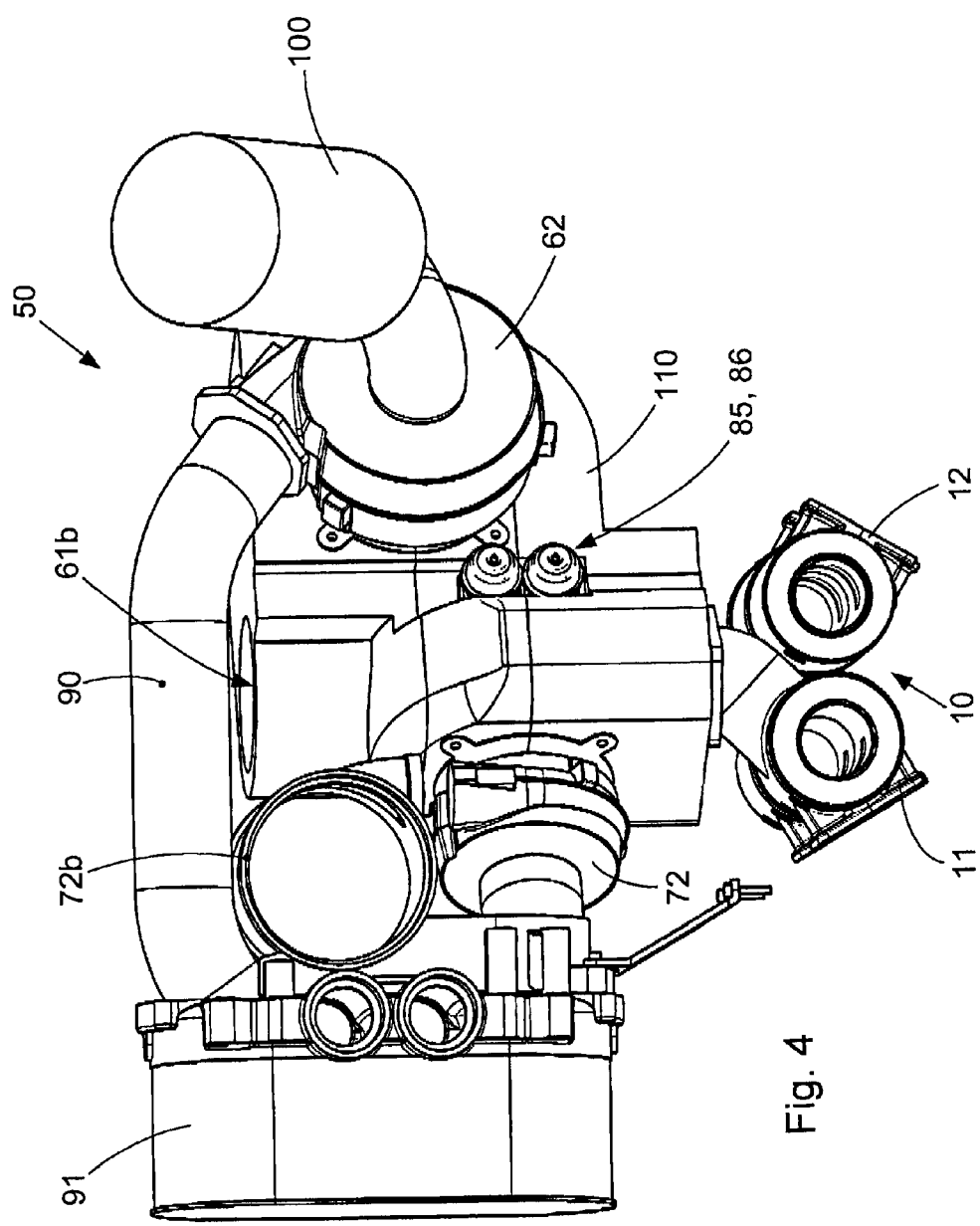
FIG. 4 shows a view similar to FIG. 2, wherein the exhaust gas turbocharger module is provided with a housing according to the invention.
Figure 5:
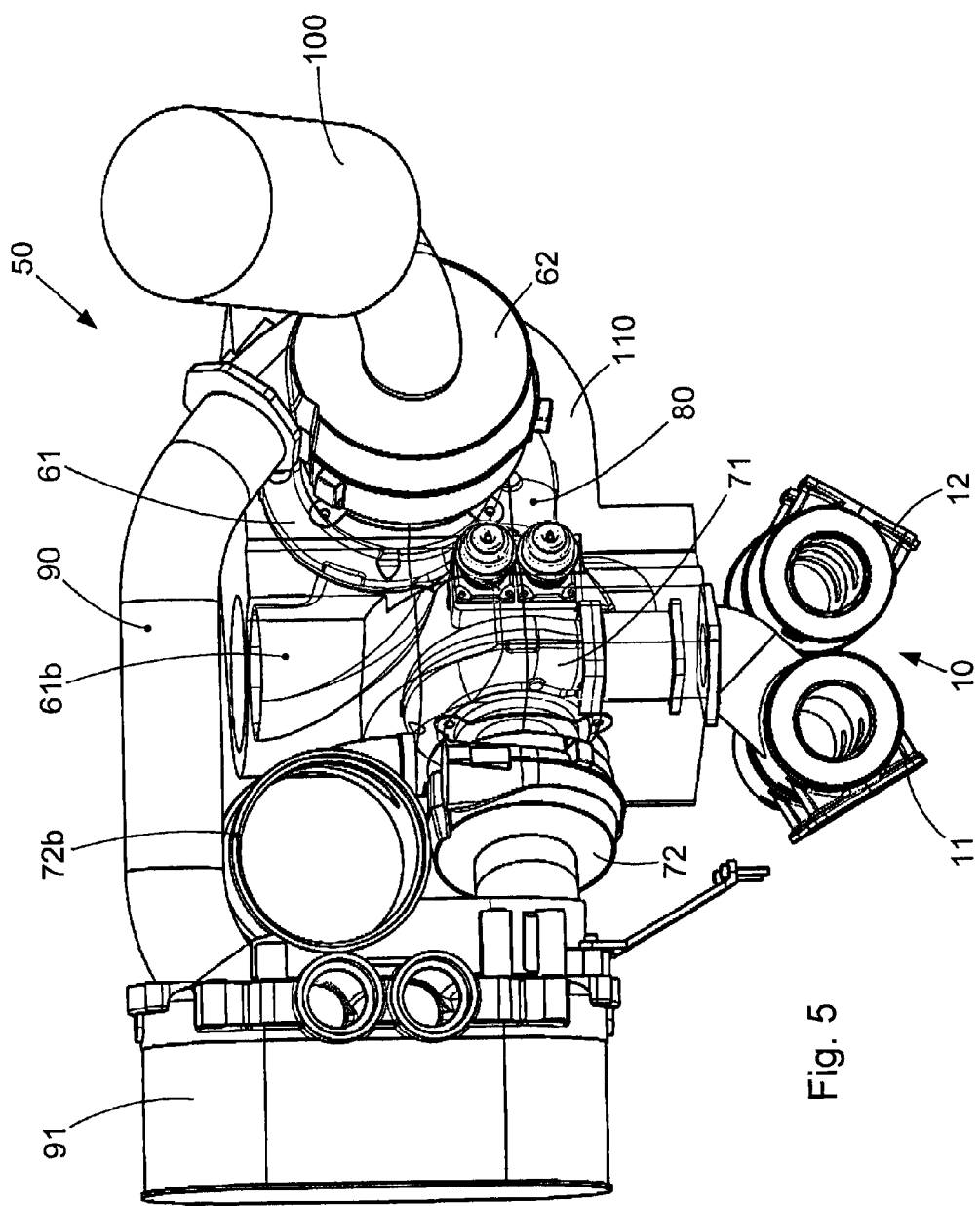
FIG. 5 shows a view similar to FIG. 4, wherein the housing is illustrated transparently so that the contours of the internal components are visible.

As is shown in FIG. 3, the first turbocharger axis A1 is arranged in a first axis plane E1 and the second turbocharger axis A2 is arranged in a second axis plane E2, wherein the second axis plane E2 is arranged parallel to and at a predetermined distance Z from the first axis plane E1.

As a result of this distance or axial offset Z, the exhaust gas connection line 80 leads from an axial exhaust gas output 71b of the high-pressure turbine 71 to the radial exhaust gas input 61a of the low-pressure turbine 61 in a particularly space-saving manner.

Figure 7:
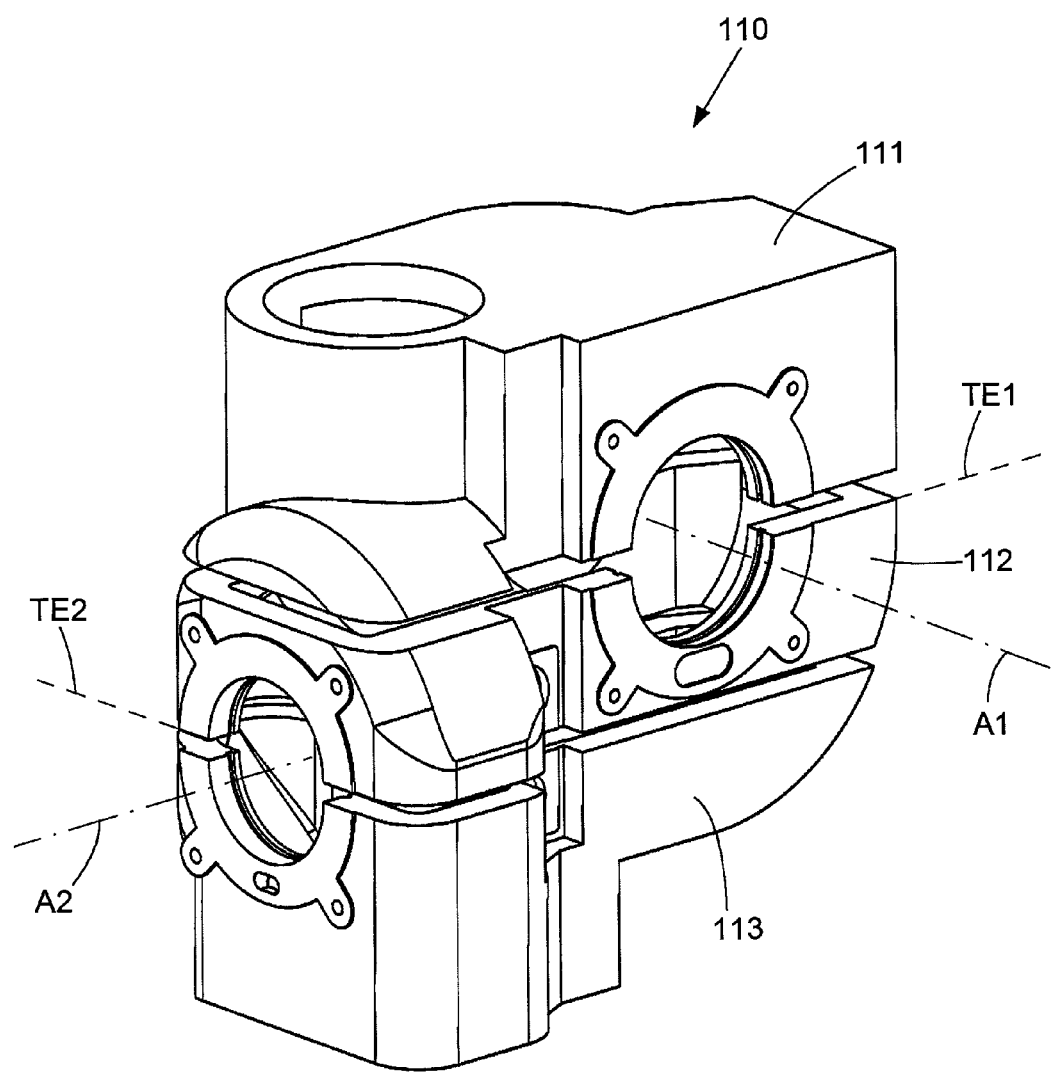
FIG. 7 shows a perspective exploded view of a housing of the exhaust gas turbocharger module from FIG. 2.
Figure 8:
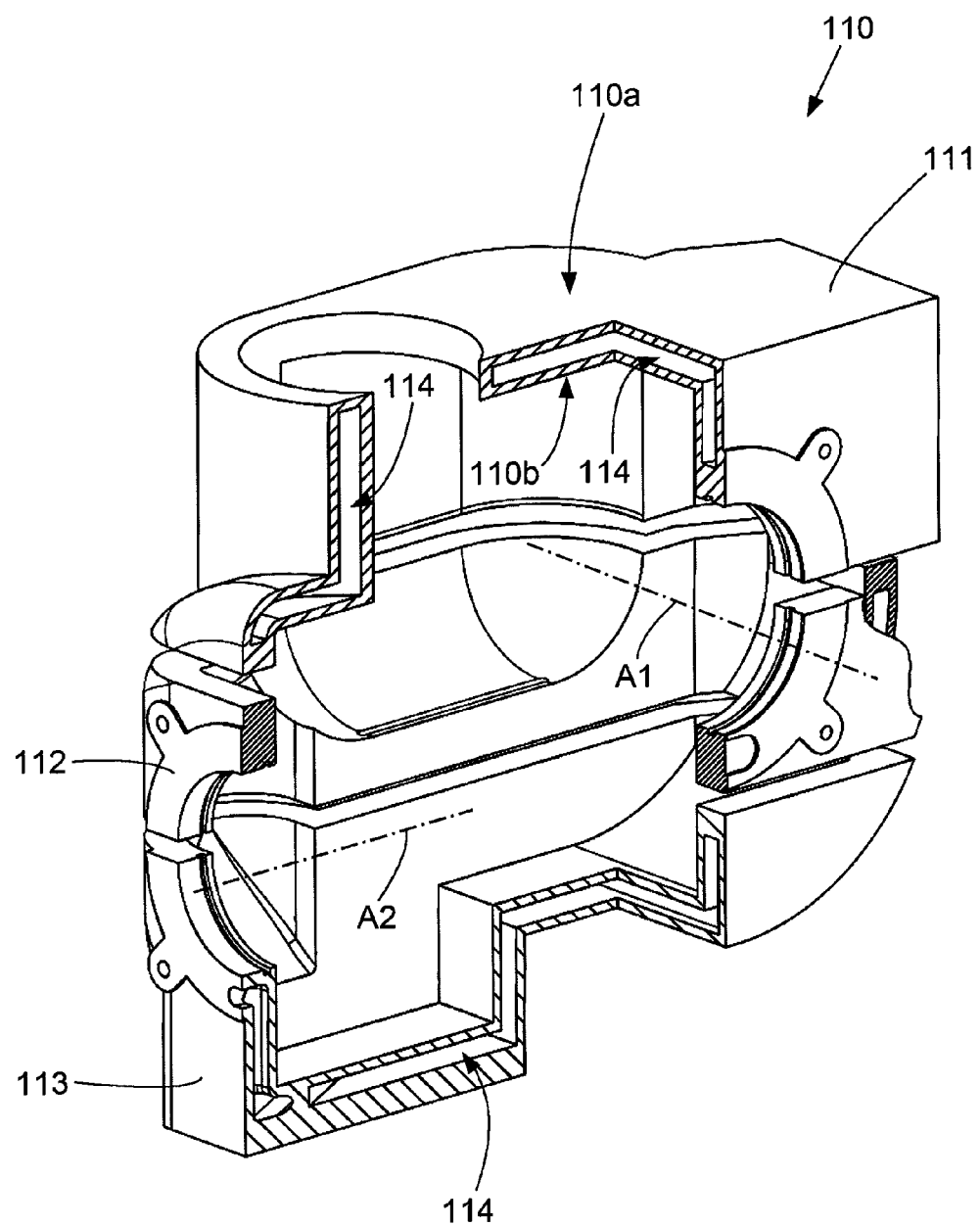
FIG. 8 shows a sectional perspective exploded view of the housing from FIG. 7.

As can be seen particularly from FIGS. 7 and 8, the housing 110 is formed of three parts and has a top part 11, a middle part 112, and a bottom part 113. In this way, two housing dividing planes TE1, TE2 extending parallel to one another and at a distance from one another are formed at the housing 110 so that the first turbocharger axis A1 lies in the upper housing dividing plane TE1 referring to FIG. 7, while the second turbocharger axis A2 lies in the lower housing dividing plane TE2 referring to FIG. 7.

Accordingly, the exhaust gas turbocharger module 50 according to the present invention can be preassembled in an outstanding manner so that fully preassembled exhaust gas turbocharger modules 50 can be used for installing in the internal combustion engine 1, 1a, 1b, which reduces assembly effort at the setup location of the internal combustion engine 1, 1a, 1b.

As can be seen from FIG. 8, the housing 110 is constructed so as to be at least partially double-walled so that a plurality of cooling channels 114 are formed between an outer wall 110a of the housing 110 and an inner wall 110b of the housing 110. In this way, a cooling and thermal insulation of the outer wall 110a of the housing 110 is achieved in an extremely compact manner so that, among other things, the operating reliability of the exhaust gas turbocharger module 50 according to the invention is increased.

Internal combustion engines 1, 1a, 1b according to embodiments of the present invention which are outfitted with exhaust gas turbocharger modules 50 according to the present invention will be described in the following referring specifically to FIGS. 9 to 14. Identical or similar reference numerals designate identical or similar components in the various embodiment forms of internal combustion engines 1, 1a, 1b.

Each of the internal combustion engines 1, 1a, 1b shown in FIGS. 9 to 14 has a plurality of (combustion) cylinders (not shown) and a quantity of at least one exhaust gas turbocharger module 50 according to the invention. As was already mentioned above, the high-pressure turbine 71 is connected on the input side to the exhaust gas outlet line 10 (see FIG. 1) of the internal combustion engine 1, 1a, 1b in each exhaust gas turbocharger module 50, wherein the high-pressure compressor 71 is connected on the output side to the charge air input line 20 of the internal combustion engine 1, 1a, 1b.

Each of the internal combustion engines 1, 1a, 1b shown in FIGS. 9 to 14 has a quantity of cylinders that is integrally divisible by four, wherein the quantity of exhaust gas turbocharger modules 50 corresponds to the result of the quantity of cylinders divided by four so that one exhaust gas turbocharger module 50 is provided for every four cylinders.

In each of the internal combustion engines 1, 1a, 1b shown in FIGS. 9 to 14, the cylinders are arranged in two cylinder rows 35, 40 which are parallel to one another and axially symmetrical with respect to a longitudinal axis A4 of the internal combustion engine 1, 1a, 1b, wherein the quantity of exhaust gas turbocharger modules 50 is arranged along the longitudinal axis A4 of the internal combustion engine 1, 1a, 1b in a module row.

More precisely stated, the quantity of exhaust gas turbocharger modules 50 on an upper side (not designated) of the internal combustion engine 1, 1a, 1b is arranged in such a way that every charge air connection line 90 crosses the longitudinal axis A4 of the internal combustion engine 1, 1a, 1b at an angle of 90 degrees.

In this way, all of the components of each exhaust gas turbocharger module, with the exception of the charge air intercooler 91 and the charge air connection line 90, are arranged on a longitudinal side (on cylinder row 35) of the internal combustion engine 1, 1a, 1b, whereas the charge air intercooler 91 is arranged on the opposite longitudinal side (on cylinder row 40) of the internal combustion engine 1, 1a, 1b.

In each of the internal combustion engines 1, 1a, 1b shown in FIGS. 9 to 14, the charge air aftercooling arrangement 30 has a separate charge air aftercooler 31, 32 for every cylinder row 35, 40, which charge air aftercooler 31, 32 is arranged at a longitudinal end 2 of the internal combustion engine 1, 1a, 1b and is connected on the input side to respective charge air outputs 72b (see FIG. 1) of the high-pressure compressor 72 and on the output side to charge air inputs 45 (only one of which is designated) of the internal combustion engine 1, 1a, 1b.

The charge air input line 20 has a charge air manifold 21 which extends between the two cylinder rows 35, 40 along the longitudinal axis A4 of the internal combustion engine 1, 1a, 1b and which is connected to the charge air output 72b of each high-pressure compressor 72. More exactly stated, the charge air manifold 21 extends below every charge air connection line 90 of the quantity of exhaust gas turbocharger modules 50 and between the upper side of the internal combustion engine 1, 1a, 1b and the respective charge air connection lines 90 of the exhaust gas turbocharger modules 50.

At the longitudinal end 2 of the internal combustion engine 1, 1a, 1b, the charge air manifold 21 branches into two charge air branch lines 22, 23, each of which is connected to one of the charge air aftercoolers 31, 32. The charge air input line 20 further has a charge air distributor line 24, 25 for each of the two cylinder rows 35, 40, which charge air distributor line 24, 25 is connected to the respective charge air inputs 45 of the cylinders, wherein the two charge air aftercoolers 31, 32 are connected on the output side respectively to one of the charge air distributor lines 24, 25.

Figure 9:
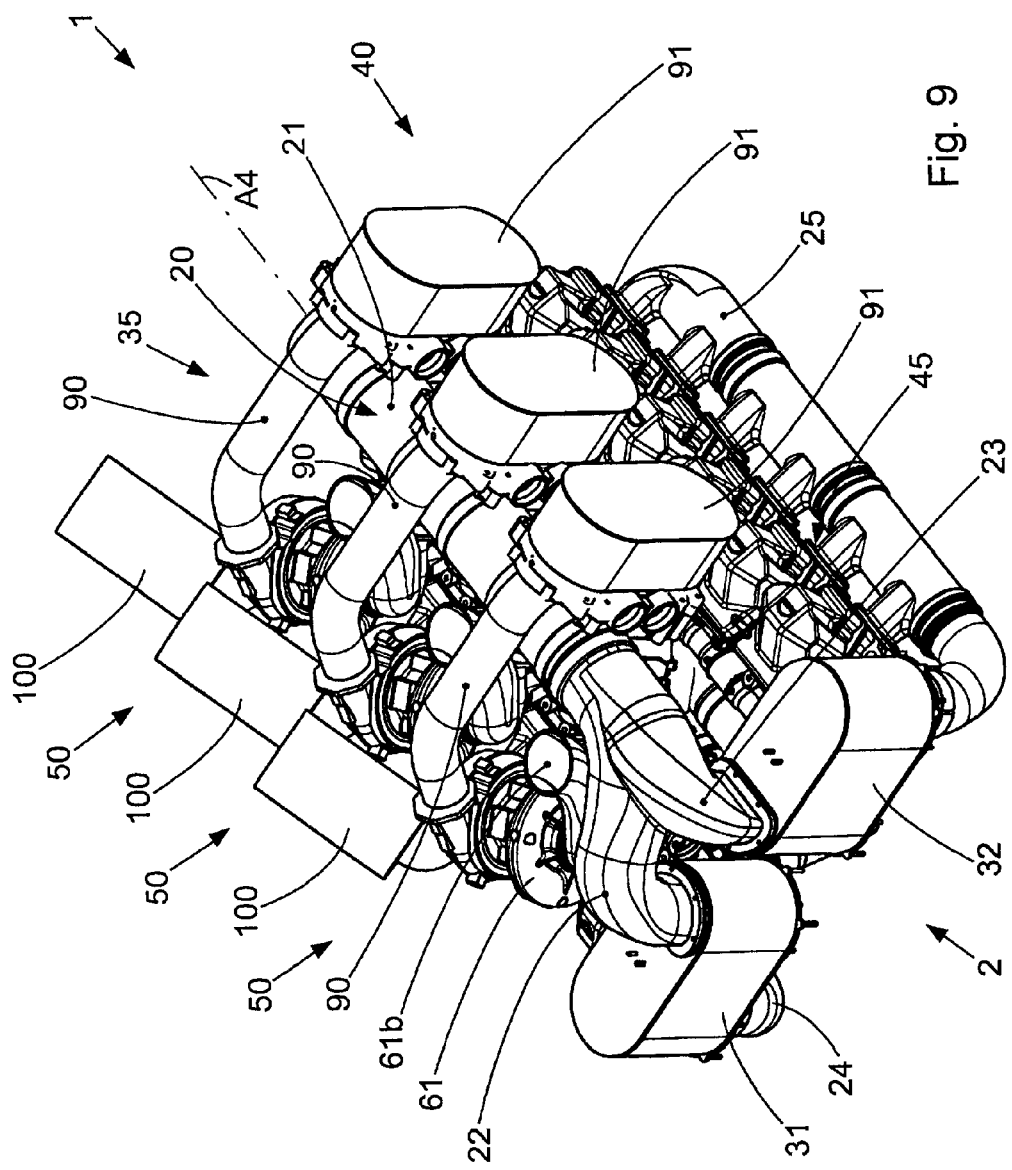
FIG. 9 shows a perspective view of an internal combustion engine according to an embodiment form of the invention which is constructed as a 12-cylinder V-engine, wherein the exhaust gas turbocharger modules are shown without housing.
Figure 10:
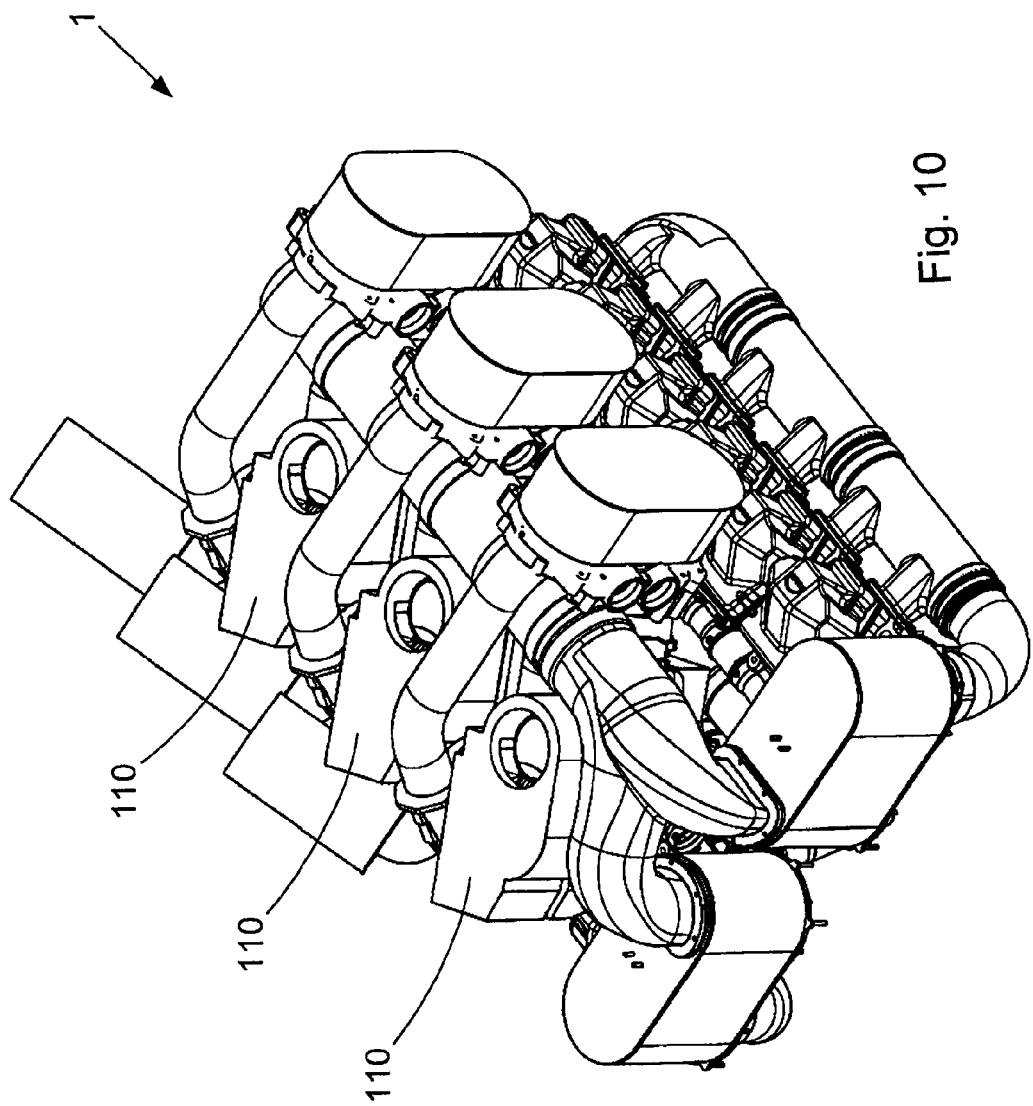
FIG. 10 shows a perspective view similar to FIG. 9, wherein the exhaust gas turbocharger modules are shown with housing.

The internal combustion engine according to the present invention can be constructed in a variety of forms, e.g., as a single-row or double-row combustion engine. FIG. 9 shows an embodiment form of the internal combustion engine 1, wherein this internal combustion engine 1 is constructed as a 12-cylinder V-engine and has three exhaust gas turbocharger modules 50. In FIG. 9, the exhaust gas turbocharger modules 50 are shown without their respective housing 110. FIG. 10 shows the internal combustion engine 1 from FIG. 9, wherein the exhaust gas turbocharger modules 50 are shown with their respective housing 110.

Figure 11:
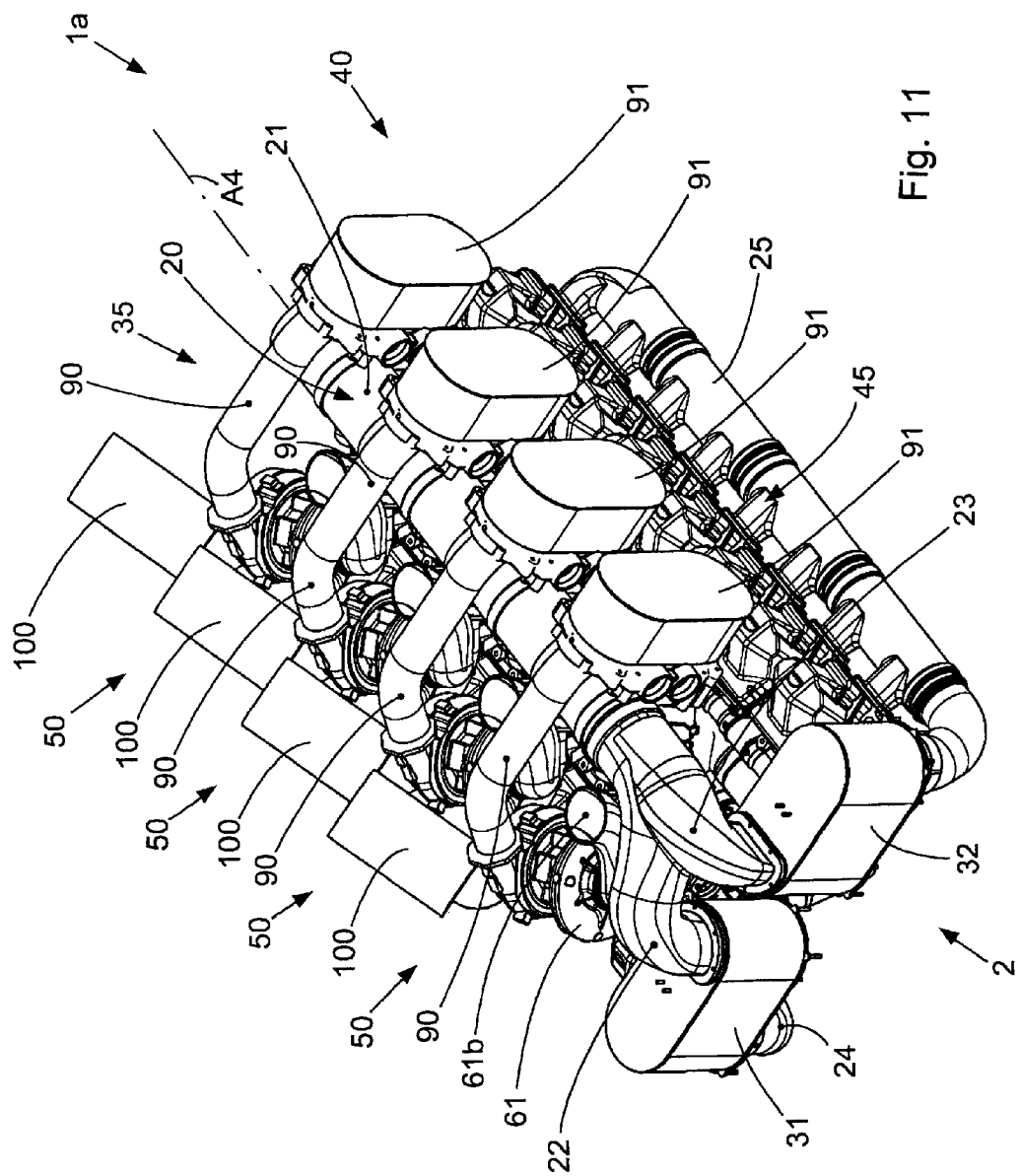
FIG. 11 shows a perspective view of an internal combustion engine according to an embodiment form of the invention which is constructed as a 16-cylinder V-engine, wherein the exhaust gas turbocharger modules are shown without housing.
Figure 12:
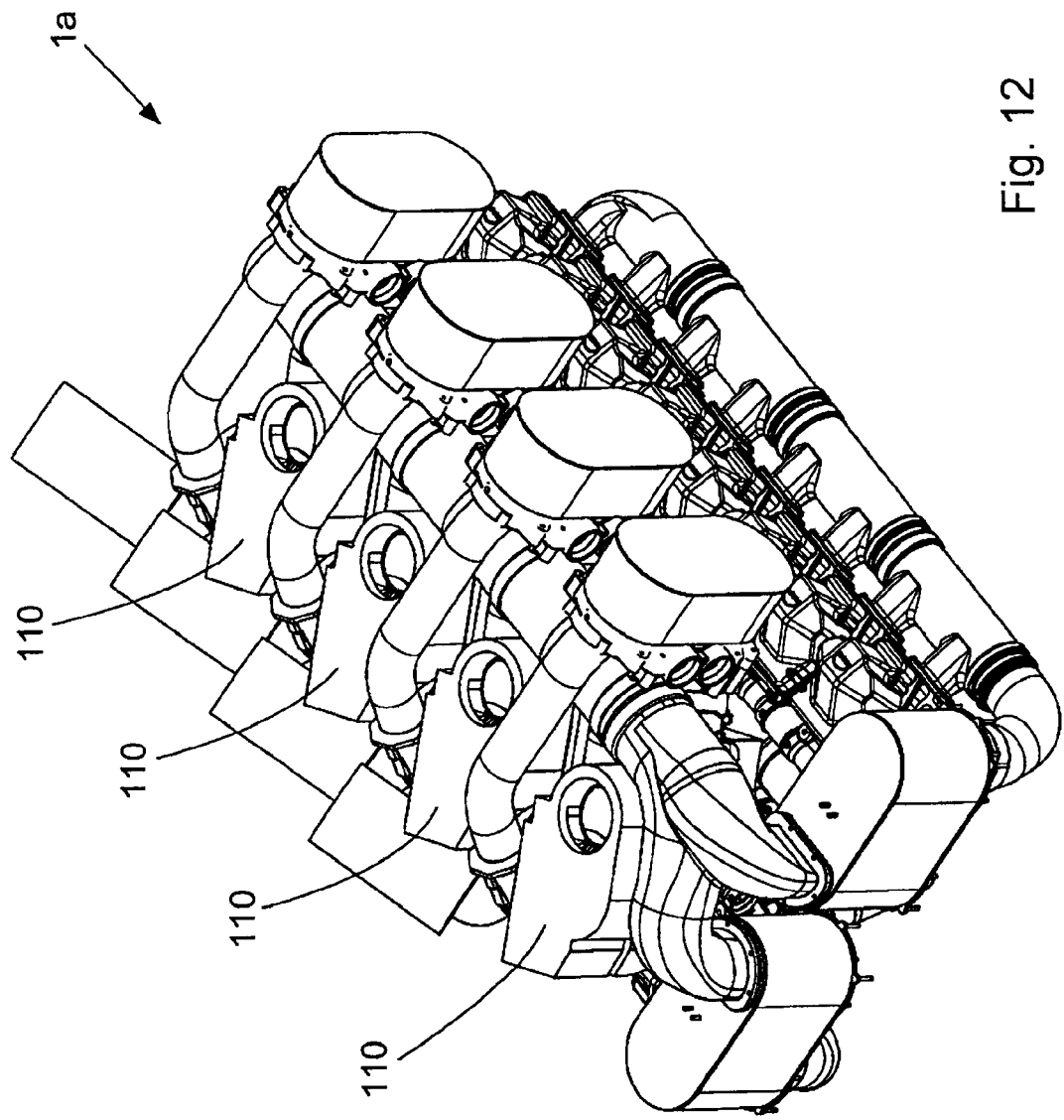
FIG. 12 shows a perspective view similar to FIG. 11, wherein the exhaust gas turbocharger modules are shown with housing.

FIG. 11 shows an embodiment form of the internal combustion engine 1a, wherein the internal combustion engine 1a is constructed as a 16-cylinder V-engine and has four exhaust gas turbocharger modules 50. In FIG. 11, the exhaust gas turbocharger modules 50 are shown without their respective housing 110. FIG. 12 shows the internal combustion engine 1a from FIG. 11, wherein the exhaust gas turbocharger modules 50 are shown with their respective housing 110.

Figure 13:
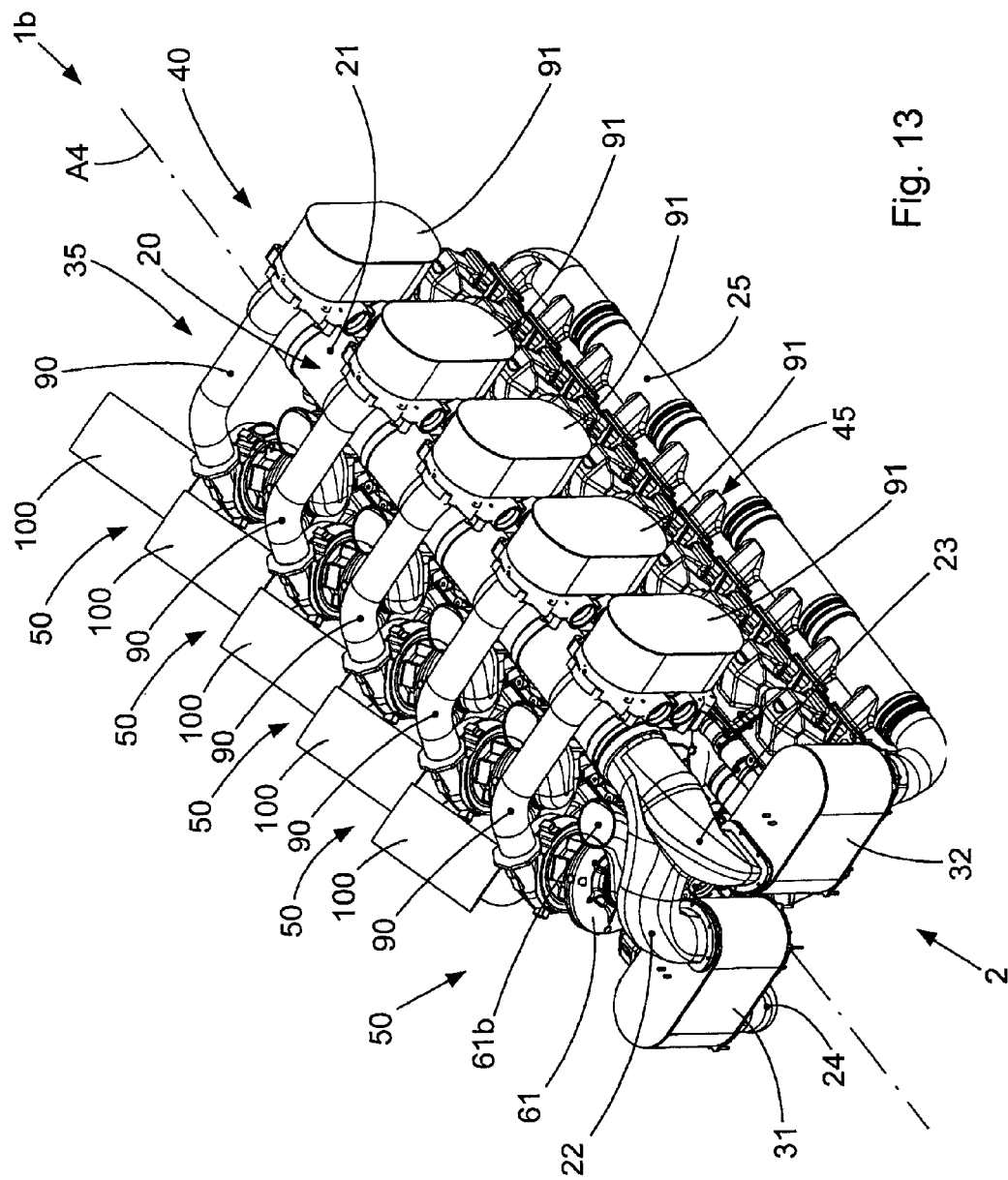
FIG. 13 shows a perspective view of an internal combustion engine according to an embodiment form of the invention which is constructed as a 20-cylinder V-engine, wherein the exhaust gas turbocharger modules are shown without housing.
Figure 14:
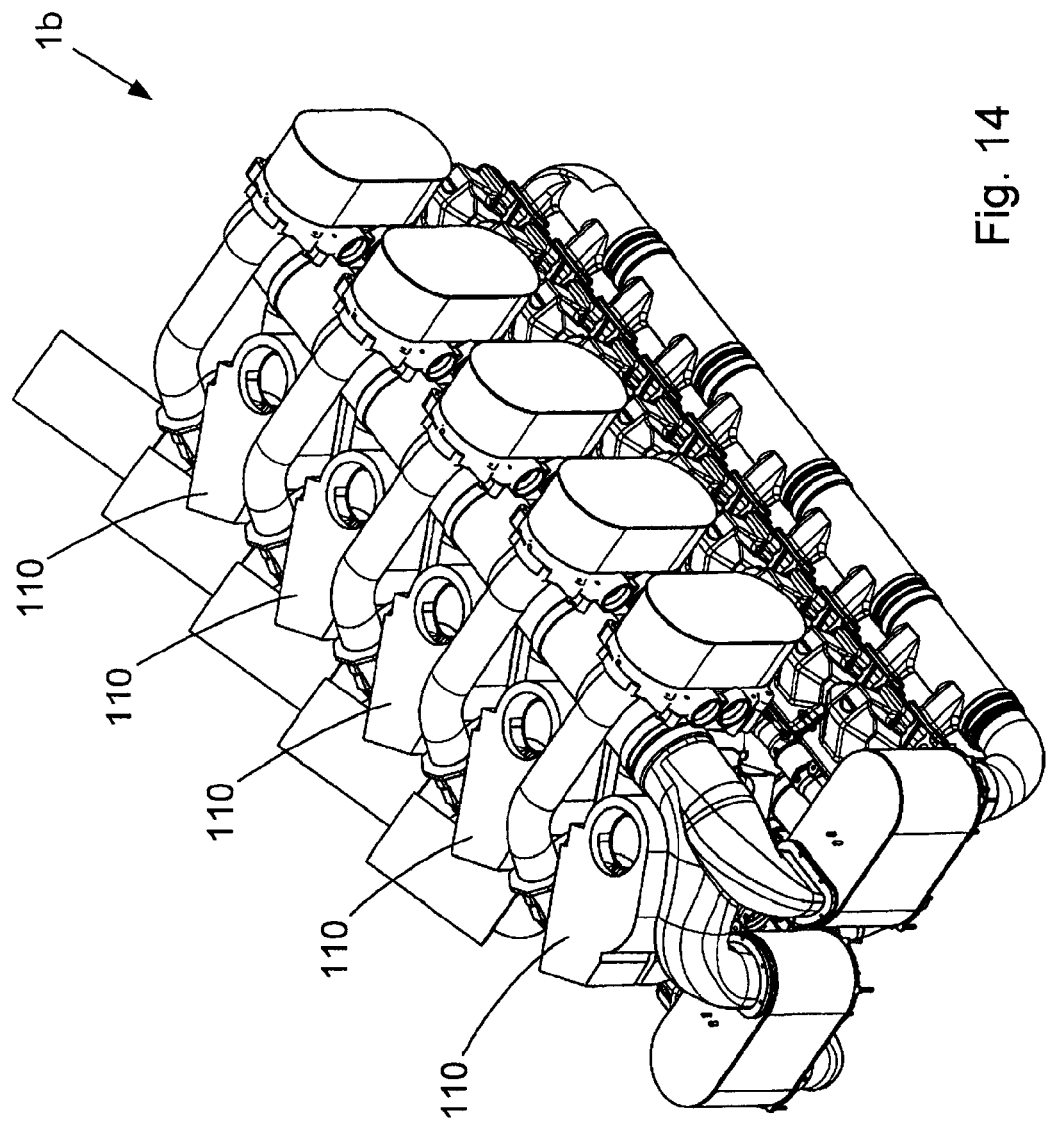
FIG. 14 shows a perspective view similar to FIG. 13, wherein the exhaust gas turbocharger modules are shown with housing.

FIG. 13 shows an embodiment form of the internal combustion engine 1b, wherein the internal combustion engine 1b is constructed as a 20-cylinder V-engine and has five exhaust gas turbocharger modules 50. In FIG. 13, the exhaust gas turbocharger modules 50 are shown without their respective housing 110. FIG. 14 shows the internal combustion engine 1b from FIG. 13, wherein the exhaust gas turbocharger modules 50 are shown with their respective housing 110.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An exhaust gas turbocharger module for an internal combustion engine, comprising:
    turbocharging assembly that includes:
    a low-pressure exhaust gas turbocharger including a low-pressure turbine and a low-pressure compressor, the low-pressure turbine and the low-pressure compressor having a common first turbocharger axis extending in a first direction;
    a high-pressure exhaust gas turbocharger including a high- pressure turbine and a high-pressure compressor, the high-pressure turbine and the high-pressure compressor having a common second turbocharger axis extending in a second direction, the first and second directions being perpendicular to one another;
    an exhaust gas connection line via which the low-pressure turbine is connected downstream of the high-pressure turbine;
    a charge air connection line via which the high-pressure compressor is connected downstream of the low-pressure, compressor; and
    a housing shaped to receive the low-pressure turbine, the high-pressure turbine, and the exhaust gas connection line, wherein at least the exhaust gas connection line is arranged with respect to the housing so as to be inside of and surrounded by the housing, wherein low-pressure compressor, the high-pressure compressor, and the charge air connection line are arranged outside of the housing, and
    wherein the turbocharging assembly forms the only turbocharging assembly of the exhaust gas turbocharger module, wherein the turbocharging assembly includes an exhaust gas bypass line arranged inside the housing and which connects an exhaust gas input of the high-pressure turbine to an exhaust gas input of the low-pressure turbine, and wherein a blocking valve is arranged in the exhaust gas bypass line for selectively opening and closing the exhaust gas bypass line,
    the high-pressure turbine is connected on an input side to an exhaust gas outlet line of the internal combustion engine, and
    the high-pressure compressor is connected on an output side to a charge air input line of the internal combustion engine.

2. The exhaust gas turbocharger module according to claim 1, wherein the turbocharging assembly includes a charge air intercooler arranged outside of the housing and connected into the charge air connection line.

3. The exhaust gas turbocharger module according to claim 1, wherein:
    the first turbocharger axis defines a line in a first plane,
    the second turbocharger axis defines a line in a second plane, and
    the second plane is parallel to and spaced apart from the first plane at a predetermined distance.

4. The exhaust gas turbocharger module according to claim 1, wherein the housing is formed of three parts so that the housing has two housing dividing planes extending parallel to one another and at a distance from one another.

5. An exhaust gas turbocharger module for an internal combustion engine, comprising:
    a turbocharging assembly that includes:
    a low-pressure exhaust gas turbocharger including a low-pressure turbine and a low-pressure compressor, the low-pressure turbine and the low-pressure compressor having a common first turbocharger axis extending in a first direction;
    a high-pressure exhaust gas turbocharger including a high-pressure turbine and a high-pressure compressor, the high-pressure turbine and the high-pressure compressor having a common second turbocharger axis extending in a second direction, the first and second directions being perpendicular to one another;
    an exhaust gas connection line via which the low-pressure turbine is connected downstream of the high-pressure turbine;
    a charge air connection line via which the high-pressure compressor is connected downstream of the low-pressure compressor; and
    a housing shaped to receive the low-pressure turbine, the high-pressure turbine, and the exhaust gas connection line, wherein at least the exhaust gas connection line is arranged with respect to the housing so as to be inside of and surrounded by the housing, wherein the low-pressure compressor, the high-pressure compressor, and the charge air connection line are arranged outside of the housing, and wherein the turbocharging assembly forms the only turbocharging assembly of the exhaust gas turbocharger module, wherein the turbocharging assembly includes an exhaust gas bypass line arranged inside the housing and which connects an exhaust gas input of the high-pressure turbine to an exhaust gas input of the low-pressure turbine, and wherein a blocking valve is arranged in the exhaust gas bypass line for selectively opening and closing the exhaust gas bypass line, the high-pressure turbine is connected on an input side to an exhaust gas outlet line of the internal combustion engine, the high-pressure compressor is connected on an output side to a charge air input line of the internal combustion engine, and wherein the charge air connection line extends from the low-pressure compressor to the high-pressure compressor in such a way that an axis defined by the charge air connection line forms a triangle with the first turbocharger axis and the second turbocharger axis in a projection in a common plane with the first turbocharger axis and the second turbocharger axis.

6. An internal combustion engine, comprising:
a plurality of cylinders; and
at least one exhaust gas turbocharger module comprising:
  a turbocharging assembly that includes:
    a low-pressure exhaust gas turbocharger including a low-pressure turbine and a low-pressure compressor, the low-pressure turbine and the low-pressure compressor having a common first turbocharger axis extending in a first direction;
    a high-pressure exhaust gas turbocharger including a high-pressure turbine and a high-pressure compressor, the high-pressure turbine and the high-pressure compressor having a common second turbocharger axis extending in a second direction, the first and second directions being perpendicular to one another;
    an exhaust gas connection line via which the low-pressure turbine is connected downstream of the high-pressure turbine;
    a charge air connection line via which the high-pressure compressor is connected downstream of the low-pressure compressor; and
    a housing shaped to receive the low-pressure turbine, the high-pressure turbine, and the exhaust gas connection line, wherein at least the exhaust gas connection line is arranged with respect to the housing so as to be inside of and surrounded by the housing, wherein the low-pressure compressor, the high-pressure compressor, and the charge air connection line are arranged outside of the housing, and wherein the turbocharging assembly forms the only turbocharging assembly of the exhaust gas turbocharger module,
    wherein the turbocharging assembly includes an exhaust gas bypass line arranged inside the housing and which connects an exhaust gas input of the high-pressure turbine to an exhaust gas input of the low-pressure turbine, and wherein a blocking valve is arranged in the exhaust gas bypass line for selectively opening and closing the exhaust gas bypass line,
    the high-pressure turbine is connected on an input side to an exhaust gas outlet line of the internal combustion engine, and
    the high-pressure compressor is connected on an output side to a charge aft input line of the internal combustion engine.

7. The internal combustion engine according to claim 6, wherein:
a quantity of the cylinders is integrally divisible by four, and
the at least one exhaust gas turbocharger module includes a quantity of exhaust gas turbocharger modules that corresponds to the quantity of cylinders divided by four so that one exhaust gas turbocharger module is provided for every four cylinders.

8. The internal combustion engine according to claim 7, wherein:
the cylinders of the internal combustion engine are arranged in at least one cylinder row along a longitudinal axis of the internal combustion engine, and
the quantity of exhaust gas turbocharger modules are arranged along the longitudinal axis of the internal combustion engine in a module row.

9. The internal combustion engine according to claim 8, wherein the quantity of exhaust gas turbocharger modules is arranged on an upper side of the internal combustion engine in such a way that each charge air connection line traverses the longitudinal axis of the internal combustion engine.

10. The internal combustion engine according to claim 9, further comprising:
a respective charge air aftercooler provided for each cylinder row, wherein each charge air aftercooler is arranged at a longitudinal end of the internal combustion engine and is connected on the input side to a charge air output of the high-pressure compressor and on the output side to charge air inputs of the cylinders of the internal combustion engine.

11. The internal combustion engine according to claim 10, wherein:
the cylinders of the internal combustion engine are arranged in two cylinder rows which are parallel to one another and axially symmetrical with respect to the longitudinal axis of the internal combustion engine, and
the charge air input line includes a charge air manifold which extends between the two rows of cylinders along the longitudinal axis of the internal combustion engine and is connected to the charge air output of each high-pressure compressor.

12. The internal combustion engine according to claim 11, wherein:
the charge air manifold branches at the longitudinal end of the internal combustion engine into two charge air branch lines which are connected in each instance to one of the charge air aftercoolers,
the charge air input line for each of the two cylinder rows has a charge air distributor line connected to the respective charge air inputs of the cylinders of the internal combustion engine, and
the charge air aftercoolers are connected on the output side in each instance to one of the charge air distributor lines.

13. The internal combustion engine according to claim 12, wherein the charge air manifold extends below each charge air connection line of the exhaust gas turbocharger modules.

\* \* \* \* \*